United States Patent [19]

Clark et al.

[11] Patent Number: 5,574,837
[45] Date of Patent: Nov. 12, 1996

[54] METHOD OF GENERATING A BROWSER INTERFACE FOR REPRESENTING SIMILARITIES BETWEEN SEGMENTS OF CODE

[75] Inventors: Linda A. Clark, Mountainside; Thaddeus J. Kowalski; Daryl Pregibon, both of Summit, all of N.J.

[73] Assignee: Lucent Technologies Inc., Murray Hill, N.J.

[21] Appl. No.: 373,340

[22] Filed: Jan. 17, 1995

[51] Int. Cl.⁶ .................................................. G06T 9/00
[52] U.S. Cl. ............................................................ 395/140
[58] Field of Search .................................... 395/140, 155, 395/161, 600, 650, 922

[56] References Cited

U.S. PATENT DOCUMENTS 5,440,742   8/1995   Schwanke ............................. 395/650

OTHER PUBLICATIONS

European Search Report.
European Patent Application No. 87117073.4 Filed on 19 Nov. 1987 by Naito et al. Translation: yes.
"Diagramming Execution Density of a Computer Program", *IBM Technical Disclosure Bulletin*, vol. 37, No. 04B, 335–336 (Apr. 1994).
G–C. Roman et al., "A Taxonomy of Program Visualization Systems", *Computer*, vol. 26, No. 12, 11–24 (Dec. 1993).
Kellner, M. I., "Non–Traditional Perspectives on Software Maintenance", 1989 IEEE Conference on Software Maintenance, IEEE Computer Society Press, Washington DC (Oct. 1989).
Glass, R. L., "Position Paper: Software Maintenance is a Solution, Not a Problem", 1989 IEEE Conference on Software Maintenance, pp. 224–225, IEEE Computer Society Press, Washington (Oct. 1989).

McFarland, M. C. and Kowalski, T. J., "Incorporating Bottom–Up Design into Hardware Synthesis", IEEE Transactions on Computer–Aided Design 9(9), pp. 938–950 (Sep. 1990).
Johnson, S. C., "Hierarchical Clustering Schemes", Psychometrika 32(3), pp. 241–254 (Sep. 1967).
Caldiera, G., "Searching Existing Programs for Reusable Components", 1989 IEEE Conference on Software Maintenance, pp. 222–223, IEEE Computer Society Prese, Washington (Oct. 1989).
Steffen, J. L., "Interactive Examination of a C Program with Cscope", USENIX Winter Conference Proceedings, pp. 170–175. USENIX Association, Dallas (Jan. 1985).
Chen, Y. F. and Ramamoorthy, C. V., The C Information Abstractor Proceedings of the Tenth International Computer Software and Applications Conference (Oct. 1986).
Prieto–Diaz, R., "A Software Classification Scheme", TR 85–19, Information and Computer Science, University of California, Irvine (1985).
Harandi, M. T. and Ning, J. Q., "Knowledge–Based Program Analysis", IEEE Software, pp. 74–81 (Jan. 1990).
Rich, C. and Wills, L. M. "Recognizing a Program's Design: A Graph–Parsing Approach", IEEE Software, pp. 82–89 (Jan., 1990).

(List continued on next page.)

*Primary Examiner*—Almis R. Jankus
*Attorney, Agent, or Firm*—Michele L. Conover

[57] ABSTRACT

A cluster interface is generated which represents similarities of semantics between segments of code with respect to both the physical constructs of the code and the underlying operations performed by the code. The generated interface represents one or more code segments. Code segments to be analyzed are received by a computer system. Statistical internal information is extracted from each code segment. An external metric is generated which is based on the extracted statistical information. An interface display is created from the external metric which represents similarity relationships between the inputted code segments based on the extracted statistical information.

18 Claims, 3 Drawing Sheets

OTHER PUBLICATIONS

Colbrook, A. and Smith, C., "The Retrospective Introduction of Abstraction into Software", 1989 IEEE Conference on Software Maintenance, pp. 166–174, IEEE Computer Society Press, Washinton (Oct. 1989).

Hausler, P.A., Pleszkoch, M.G., Linger, R.C., and Hevner, A.R., "Using Function Abstraction to Understand Program Behavior", IEEE Software, pp. 55–63 (Jan. 1990).

Benedusi, P., Cimitile, A., and DeGarlini, U., "A Reverse Engineering Methodology to Reconstruct Hierarchical Data Flow Diagrams for Software Maintenance", 1989 IEEE Conference on Software Maintenance, pp. 180–189, IEEE Computer Society Press, Washington (Oct.1989).

Choi, S.C., and Scacchi, W., "Extracting and Restructuring the Design of Large Systems", 1989 IEEE Software, pp. 66–71 (Jan. 1990).

Ricketts, J.A. DelMonaco, J.C., and Weeks, M.W., "Data Reengineering for Application Systems", 1989 IEEE Conference on Software Maintenance, pp. 174–179, IEEE Computer Society Press, Washington (Oct. 1989).

Yang, W., Horwitz, S., and Reps. T., "Detecting Program Components with Equivalent Behaviors", TR–840, Computer Sciences Dept., Univ. of Wisconsin, Madison (Apr. 1989).

Kowalski, T.J., Am Artificial Intelligence Approach to VLSI Design, Kluwer Academic Publishers, Boston (1986).

Sokal, R.R. and Sneath, P.H. Principles of Numerical Taxonomy, W.H. Freeman and Company, San Francisco (1963).

Graham, R.L., Knuth, D.E., and Patashnik, O., Concrete Mathematics, Addison Wesley, New York (1989).

Kowalski, T.J. Seaquist, Goguen, H.H., Ellis, B. and Puttress, J.J., Castillo, C.M., Rowland J. R., Rath, C.A., Wilson, J.M., and Vesonder, G.T. and Schmidt, J.L., "The AT&TC and C++ Programming Environment: An Integrated Reflective Toolkit", to Proceedings of the International Workshop on UNIX–Based Software Development Environments, USENIX, Dallas, TX (Jan. 16, 1991).

Tarjan, R.E., Data Structures and Network Algorithms, Society for Industrial and Applied Mathematics, Philadelphia (1983).

METHOD OF GENERATING A BROWSER INTERFACE FOR REPRESENTING SIMILARITIES BETWEEN SEGMENTS OF CODE

BACKGROUND OF THE INVENTION

The present invention is directed to a method of generating a browser interface and, more particularly, to a method of generating an interface for representing similarities between one or more code segments.

In general, there are two types of browser interfaces which are commonly used to analyze segments of computer code. The first type of browser interface browses segments of code based on external information provided by the user. Examples of external information include authors of code and dates representative of when modifications to the code have occurred. A user selects the external information which is to be used to browse the code. Relevant segments of code are retrieved, and a listing of each retrieved code segment is displayed. The user can then browse each of the retrieved code segments. While these types of browser interfaces are useful for identifying code segments which have been affected by external information, the retrieved code segments are not necessarily similar in content or function. Similarity in content refers to code segments which are similar in structure, e.g., contain the same commands. Similarity in function refers to code segments which perform the same procedures, e.g., a procedure for retrieving certain parameters from a block of data.

The second type of browser interface browses segments of code based on internal information. This internal information is typically syntax-based and can include variable names and operators. The user selects the type of internal information which is used to browse the code. Segments of code which contain the internal information are retrieved. The user can then browse each retrieved code segment. Identifying code segments containing similar internal information can aid the user in analyzing the code. While this type of browser interface tends to retrieve codes of similar content or functions, these types of browser interfaces only recognize exact matches or, in some cases, matches having similar static characteristics, such as identical identifiers.

SUMMARY OF THE INVENTION

In accordance with the present invention, a cluster interface is generated which represents similarities of semantics between segments of code with respect to both the physical constructs of the code, hereinafter referred to as structure, and the underlying operations performed by the code, hereinafter referred to as function.

An interface is generated which represents one or more code segments. Code segments to be analyzed are received by a computer system. Statistical internal information is extracted from each code segment. An external distance function is generated which is based on the extracted statistical information. An interface display is created from the external distance function which represents similarity relationships between the inputted code segments based on the extracted statistical information.

DETAILED DESCRIPTION

Figure 1:
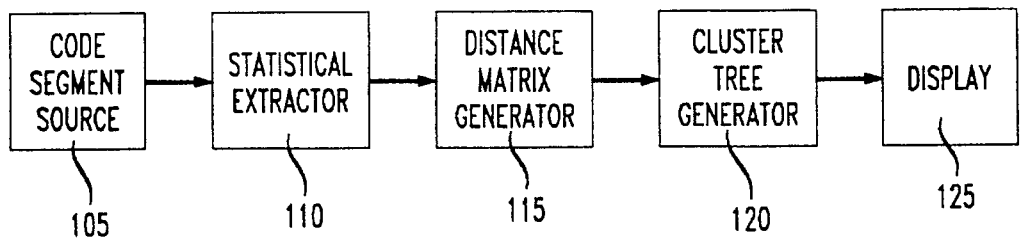
FIG. 1 illustrates a block diagram of a system for generating an interface.

FIG. 1 illustrates a block diagram of a typical system 100 for generating a cluster interface in accordance with the present invention. Code segment source 105 provides segments of code, representative of one or more programs, to a statistical extractor 110. Those skilled in the art will recognize that code segment source 105 will encompass a wide variety of devices and processes capable of code storage and/or generation. For example, code segment source 105 may be a memory device in which the code segments are simply stored in the device, or more generally, code segment source 105 may be a process which generates segments of code and sends the code segments to statistical extractor 110 in real time. The statistical extractor 110 extracts predefined data attributes from each code segment. These data attributes may include, but are not limited to, variable names, operators and data types. A method for extracting data attributes is disclosed in commonly assigned co-pending patent application entitled "Method of Identifying Similarities in Code Segments" filed concurrently herewith.

A distance matrix generator 115 receives the statistics from statistical extractor 110 and identifies similarities between the segments of code as a function of a weighting scheme as will be described in detail hereinafter. Those skilled in the art will recognize that the weighting scheme may be determined by a number of means, e.g., interaction with a user of the system 100 or application programs which scan the segments of code and select a specific weighting scheme based on criteria which defines the segments as will be described in detail hereinafter. Cluster tree generator 120 generates cluster trees based on the generated distance matrices. Display signals comprising control signals, data signals representative of the cluster trees and other signals necessary for producing a cluster interface are transmitted to a display 125.

Figure 2:
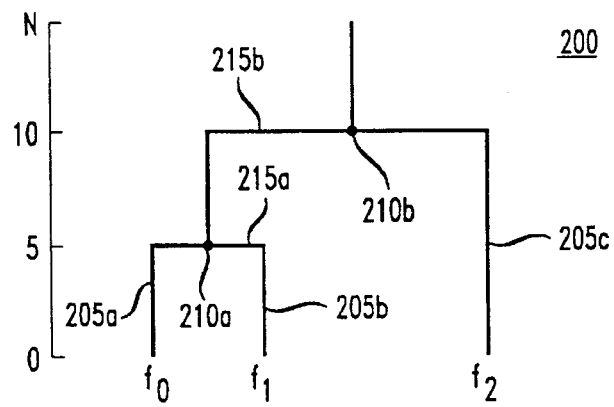
FIG. 2 illustrates a cluster interface representative of a simple program generated by the system of FIG. 1.

FIG. 2 illustrates the elements of a cluster interface 200 generated in accordance with the present invention. The interface 200 represents a program which contains three code segments, $f_0$, $f_1$, and $f_2$. Each segment extends from a leaf 205. Leaves 205a and 205b are connected to one another by crossbar 215a and leaf 205c is connected to leaves 205a and 205b by crossbar 215b. The height of the crossbars 215a and 215b correspond to a distance measurement which indicates the degree of similarity of the segments of code represented by each leaf 205 attached to the respective crossbar 215. Non-terminal nodes 210a and 210b reference a point of similarity between two or more leaves which extend from the node 210. A scale ranging from 0 to N indicates the level of similarity where 0 indicates identical segments and N indicates the highest level of dissimilarity.

The interface is used by identifying the leaves 205 corresponding to the segments of interest and identifying the crossbar 215 or node 210 connecting the two leaves 205. For example, if segments $f_0$ and $f_1$ are compared, the crossbar 215a connecting the leaves for the segments $f_0$ and $f_1$ corresponds to the number 5 on the scale. This can be interpreted as indicating that the segments $f_0$ and $f_1$ have a number of similarities but are not identical. Likewise segment $f_2$ has the same degree of similarity to segments $f_0$ and $f_1$ as is established by crossbar 215b. Crossbar 215b corresponds to the number 10 on the scale and indicates that $f_2$ is less similar to either $f_0$ or $f_1$ than $f_0$ is to $f_1$.

Once a point of similarity is established for one or more segments of interest, the segments can be retrieved from the processor. For example, by using an input means, such as, for example, a mouse, a user can retrieve the lines of code corresponding to the segments $f_0$ and $f_1$ which can then be displayed in a separate display for line-by-line comparisons of the statements contained therein. Other programs can be used to illustrate the degree of similarity between each line of code contained within each segment. For example, a dot plot display can be used to illustrate the similarity of the code segments as described in co-pending patent application Ser. No. 07/853,459, entitled "Method & Apparatus for Studying Very Large Sets of Data", filed Mar. 18, 1992 which is commonly assigned and incorporated herein by reference.

Figures 3, 6:
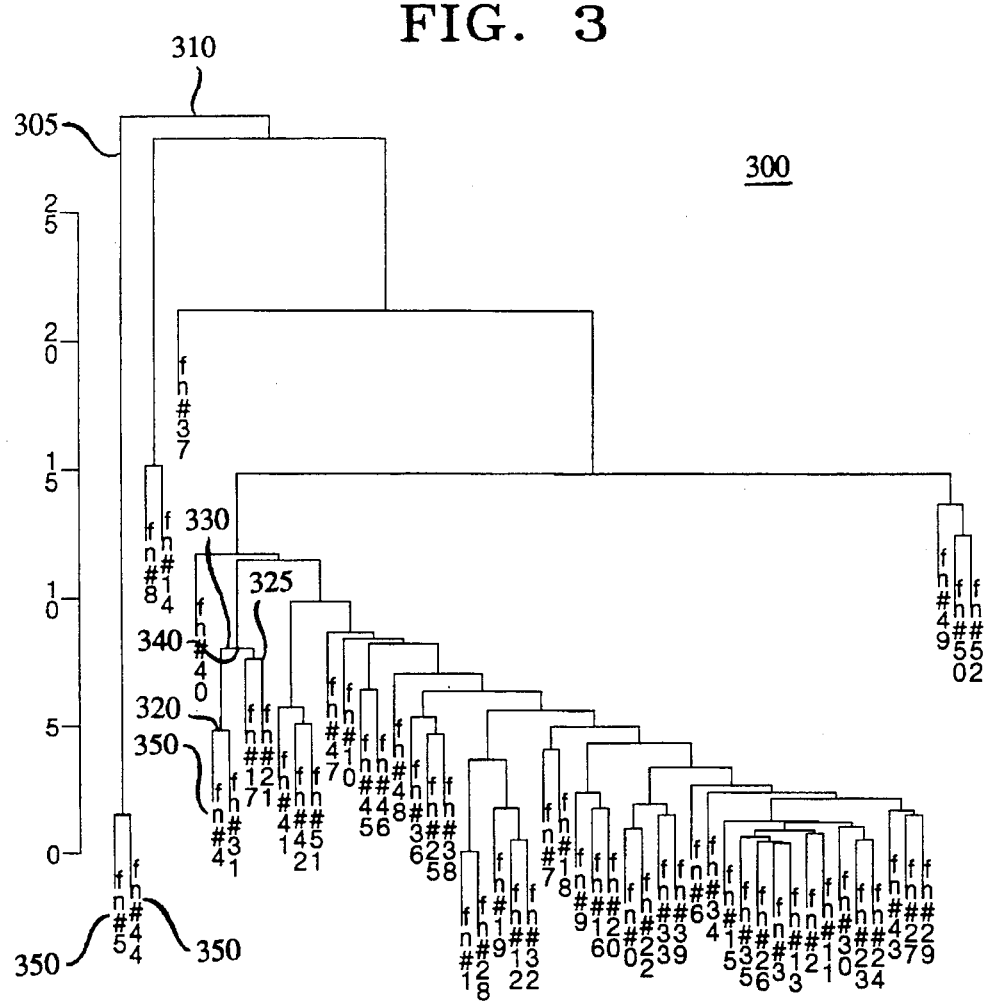
FIG. 3 illustrates a typical cluster interface of a more complex program generated by the system of FIG. 1.
FIG. 6 illustrates a graph depicting how the data used to construct the cluster interface of FIG. 4 may be weighted.

A cluster interface 300 representative of a more complex program is illustrated in FIG. 3. Each leaf 305 of the interface 300 is labelled by a different function which is representative of a particular code segment. As can be seen, the crossbars 310 interconnecting the leafs are represented in a hierarchical fashion to indicate the distance measurement between each of the code segments. For example, crossbar 320 connects segments 4 and 31, thereby indicating that their distance is 5. Likewise crossbar 325 indicates that segments 17 and 21 have a distance of 8. Crossbar 330 indicates that either of segments 4 or 31 have a distance of 8.5 with the cluster comprising segments 17 and 21. Therefore, the cluster interface can be used to analyze the different code segments and quickly identify those segments which may have similar features. For example if a user is making modifications to a program, the user can access the cluster interface to determine which code segments may require similar modifications.

As described above, each cluster interface represents one or more programs which are partitioned into a plurality of predefined code segments based on the characteristics of the computer language in which the program was written. The segments are preferably determined in a manner for which the statements contained in each segment are representative of a subroutine or function of the program. For example, a program written in C language may be partitioned into segments which are defined by projects, files, function blocks, basic blocks, complex statements, line statements or expressions, each of which is well-known to those skilled in the art.

Figure 4:
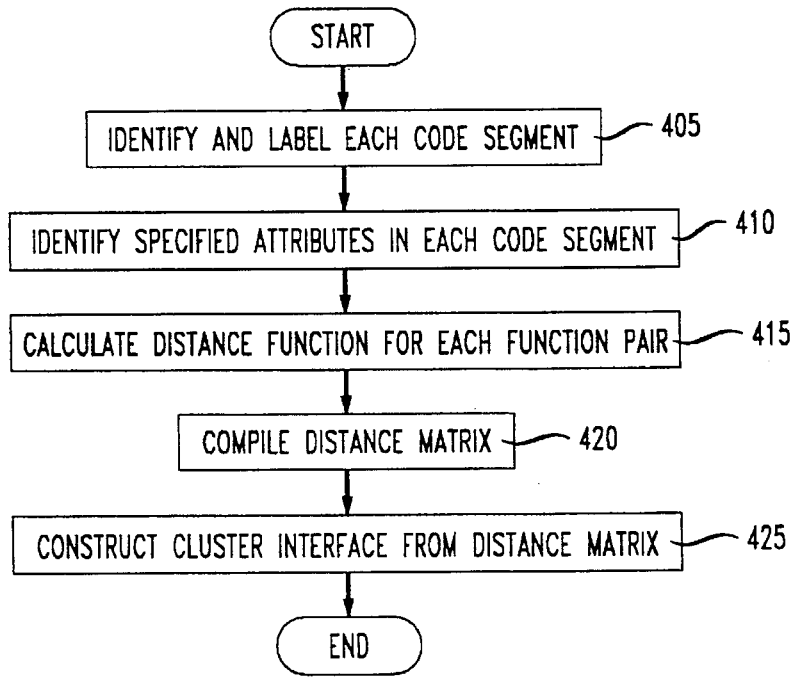
FIG. 4 illustrates a flow chart of the steps for generating cluster interfaces.

FIG. 4 is a flow chart illustrating the steps for generating the cluster interface. The program or programs are initially scanned and each segment is identified and labelled (step 405). For example, the program represented below comprises two files. The first file, pers.c, contains two functions $f_0$, and $f_1$. The second file, bus.c, contains one function labelled $f_2$.

```
pers.c
f0
char*
relations(char*name, float age)
{
    static char buf[32];
    int i;
    char*p;
}
f1
int
friends(char*name, char*address)
{
    int i;
    int j;
    char*p;
    char*q;
}
bus.c
f2
double
employees(char*name, double salary)
{
    extern char*malloc( );
    char*p;
    double bonus;
}
```

Attributes of interest are specified which are then identified in each code segment (step 410). Illustratively, identifiers (I) and types (T) are identified in each function $f_0$, $f_1$ and $f_2$ as illustrated below:

$f_0$
I: relations, name, age, buf, i, p
T: char*, char*, float, char, int, char*
$f_1$
I: friends, name, address, i, j, p, q
T: int, char*, char*, int, int, char*, char*
$f_2$
I: employees, name, salary, malloc, p, bonus
T: double, char*, double, externchar*, char*, double The information shown above can be constructed into a table as shown below:

| Attribute (Identifier) | $f_0$ | $f_1$ | $f_2$ | weight | k |
|---|---|---|---|---|---|
| relations | 1 | 0 | 0 | 2 | 1 |
| name | 1 | 1 | 1 | 2 | 2 |
| age | 1 | 0 | 0 | 2 | 3 |
| buf | 1 | 0 | 0 | 2 | 4 |
| i | 1 | 1 | 0 | 2 | 5 |
| p | 1 | 1 | 1 | 2 | 6 |
| friends | 0 | 1 | 0 | 2 | 7 |
| address | 0 | 1 | 0 | 2 | 8 |
| j | 0 | 1 | 0 | 2 | 9 |
| q | 0 | 1 | 0 | 2 | 10 |
| employees | 0 | 0 | 1 | 2 | 11 |
| salary | 0 | 0 | 1 | 2 | 12 |
| malloc | 0 | 0 | 1 | 2 | 13 |
| unit award | 0 | 0 | 1 | 2 | 14 |
| Attribute (Type) | $f_0$ | $f_1$ | $f_2$ | weight | k |
| char* | 3 | 4 | 2 | 3 | 15 |
| float | 1 | 0 | 0 | 3 | 16 |
| char[32] | 1 | 0 | 0 | 3 | 17 |
| int | 1 | 3 | 0 | 3 | 18 |
| double | 0 | 0 | 3 | 3 | 19 |
| char* () | 0 | 0 | 1 | 3 | 20 |

The first column in the first chart lists the specific identifier. The next three columns, i.e., $f_0$, $f_1$, $f_2$ indicate the number of occurrences of that identifier within the particular function. The next column indicates the weight assigned to the identifier and the last column indicates a number which is assigned to the identifier. The second table is identical to the first except that the first column lists the types found in the program rather than the identifier.

An identifier indicates the place in a program in which a particular state is remembered. A type indicates the characteristics of the state. In determining the degree of similarity between each of the functions, an external metric, in this case a distance function, is calculated as follows:

$$d_{i,j} = \sum_k w_k (X_{ik} - X_{jk})^2$$

where $d_{i,j}$=distance between segment i and segment j
k=number assigned to attribute where k=1, ... K
$W_k$=weight applied to $k^{th}$ attribute
$X_{ik}$=value of $k^{th}$ attribute in segment i
$X_{jk}$=value of $k^{th}$ attribute in segment k The distance function produces a distance measurement which indicates the degree of similarity between the identifiers and function types contained within the two segments being compared (step 415). A distance function is computed for each possible pair of functions. For example, given that $W_I$=2, and $W_T$=3, the distance function for segments $f_0$ and $f_1$ is computed as follows:

$$d_{01} = \sum_{k=1}^{14} 2(X_{0k} - X_{1k})^2 + \sum_{k=15}^{20} 3(X_{0k} - X_{1k})^2$$

$$d_{0I} = 2(1-0)^2 + 2(1-1)^2 \ldots 3(3-4)^2$$
$$d_{0I} = 3.74$$

A distance function is determined for each pair and compiled into a distance matrix (step 420) as shown below:

|     | $f_0$ | $f_1$ | $f_2$ |
| --- | --- | --- | --- |
| $f_0$ | 0 | 3.74 | 4.69 |
| $f_1$ | 3.74 | 0 | 5.66 |
| $f_2$ | 4.69 | 5.66 | 0 |

Figure 5:
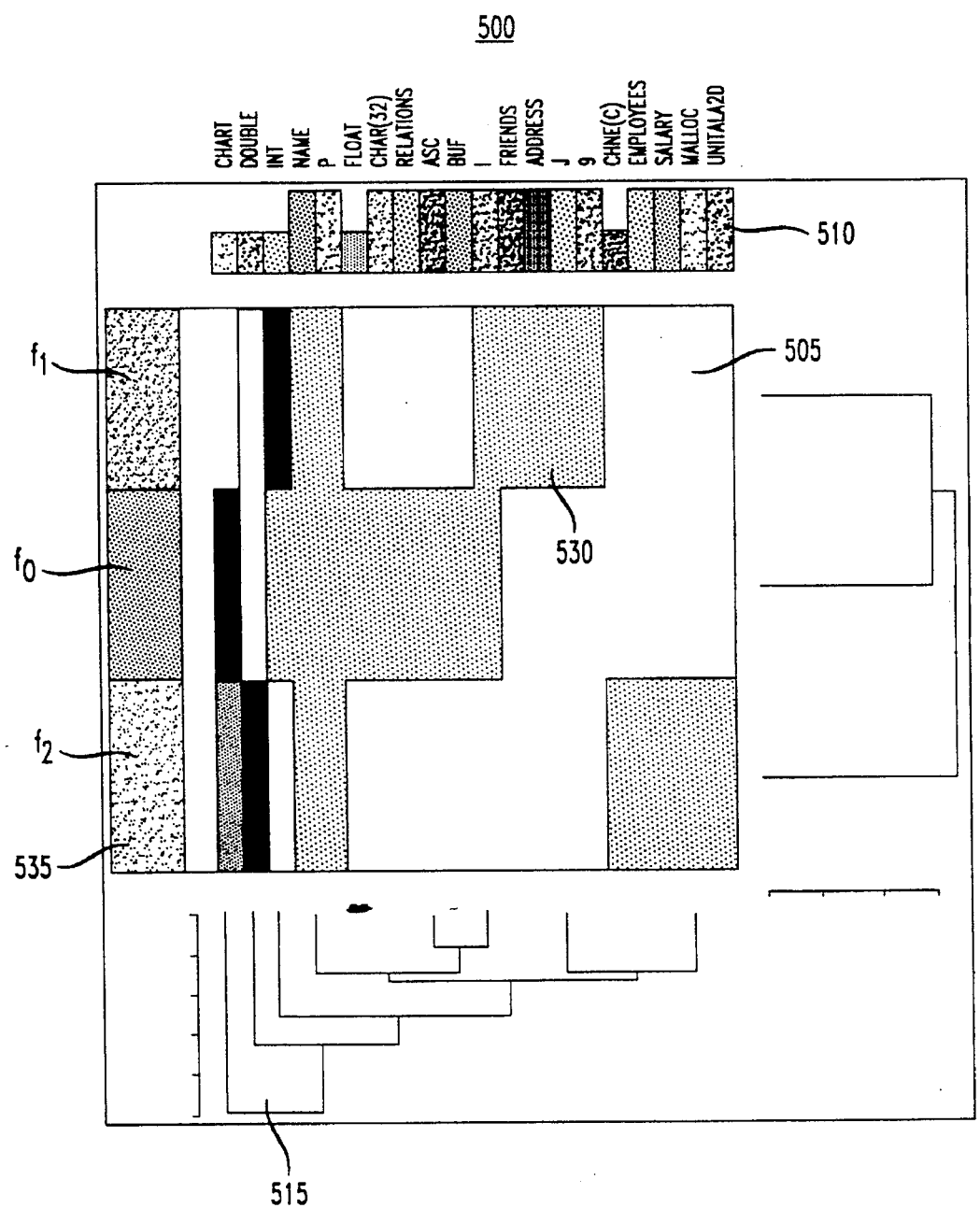
FIG. 5 illustrates a cluster interface and the mechanisms by which the interface can be altered.

The distance functions are used to construct the cluster interface. FIG. 5 shows a display 500 which illustrates a cluster interface generated for code segments $f_0$, $f_1$ and $f_2$. The cluster interface maps the similarities between each of the segments based on certain predefined constraints (step 435). The constraints are generally defined in terms of a weighting scheme which may be selected by the user to generate the cluster interface. The bars 510 illustrated at top of the display 505 are used to represent the weights which may be applied to the attributes to determine specific distance relationships. The weights may place additional emphasis on certain structural features, such as, for example, specific variables or operators. The weights may also be used to emphasize certain functions such as particular subroutines or particular commands. In accordance with the present example, each of the bars 510 represents an identifier or type contained in at least one of the functions as indicated by the label associated with each bar. A full bar is equal to the greatest weight (e.g. 1) and smaller bars represent fractional amounts. A cluster interface 515 illustrating the affect of the particular weighting scheme selected is located at the bottom of display 505 include bars on side. If the weights defined by the bars 510 are altered, the cluster interface 515 will change accordingly.

To the right of display 505 is a cluster interface 525 which represents the similarity of the code segments being compared. To the left of the display 505 are bars 535 which are representative of each of the function blocks being compared. Each function block is represented by a different color bar. Each bar 535 can be weighted to indicate the importance of each function block. A full bar represents a weight of one. Display 505 generates an intensity matrix of the type referenced above which indicates the similarity of the code segments when the weighting scheme is applied. Each attribute under consideration is represented in display 505 by a block 530. Blocks 530 corresponding to a particular weighted attribute and code segment are generated which represent the corresponding distance measurement and indicate the degree of similarity relative to the other code segments to which the same weight has been applied. The intensity of the block 530 represents the data values. Illustratively, the darker the block 530, the larger the data value.

In operation, a user can access the code segments represented by the cluster interface 500 by using an input device such as a mouse (not shown) to highlight one of the leaves of cluster interface 500. This causes a secondary interface to be generated. FIG. 6 illustrates an illustrative embodiment of secondary interface 600 if the leaf representing function $f_0$ is highlighted.

The secondary interface 600 is divided into two subdisplay 605 and 610. Subdisplay 605 displays the source code for case segment $f_0$. Subdisplay 610 displays the attribute listing for code segment $f_0$. A user can access the secondary interface 600 in order to compare code segments indicated as having strong similarities as represented by a block 530 having a darker intensity. Multiple functions can be represented in adjacent secondary interface so that the corresponding code segments can be compared. The secondary interface can also be used to make universal modifications to different code segments.

For example, a user can access the statistical information associated with one or more code segments represented by a particular leaf of the cluster interface by using the input device to highlight the particular leaf. This information may also be displayed in the secondary interface.

It will be appreciated that those skilled in the art will be able to devise numerous and various alternative arrangements which, although not especially shown or described herein, embody the principles of the invention and are within its scope and spirit. It is to be understood by those skilled in the art that other well-known external metrics may be used to determine the degree of similarity between one or more code segments. For example, multidimensional scaling techniques may be used to measure the degree of similarity between two code segments. Such techniques are described in Susan S. Schiffman, et al., *Introduction to Multimedia Scaling Theory, Methods and Applications,* Academic Press Inc., 1981.

We claim:

1. An apparatus for generating an interface corresponding to at least one segment of code comprising:

means for extracting statistical information attributes from the at least one segment of code and using said statistical information attributes to generate an external metric;

means for creating an interface display from the external metric, said interface display including a first cluster interface which illustrates the affects of applying a weighing scheme to one or more of said statistical information attributes, said weighing scheme being applied add emphasis to a particular statistical information attribute, and a second cluster interface which illustrates the similarity of the code segments being compared based on the applied weighing scheme; and means for generating said interface display.

2. The interface according to claim 1 wherein said external metric is a distance function.

3. The interface according to claim 2 where said distance function, $d_{i,j}$ is equal to $$d_{i,j} = \sum_k w_k (X_{ik} - X_{jk})^2$$

where $d_{i,j}$=distance between segment i and segment j
k=number assigned to attribute where k=1, ... K
$W_k$=weight applied to $k^{th}$ attribute
$X_{ik}$=value of $k^{th}$ attribute in segment i
$X_{jk}$=value of $k^{th}$ attribute in segment k.

4. The interface according to claim 1 wherein said metric incorporates multidimensional scaling techniques.

5. The interface according to claim 1 further comprising means for storing said at least one segment of code.

6. The interface according to claim 1 wherein said interface display first cluster interface is a tree representation.

7. The interface according to claim 6 wherein said second cluster interface is a tree representation.

8. The interface according to claim 1 further comprising:
    active display means for highlighting a particular statistical information attribute contained in said interface display; and
    means for generating a second interface display which displays information relating to the highlighted statistical information attribute.

9. A method of generating an interface representing one or more code segments comprising the steps of:
    extracting statistical information attributes from the one or more code segments;
    generating an external metric based on the extracted statistical information attributes; and
    creating an interface display from the external metric which display represents similarity relationships between the one or more code segments, said interface display including a cluster interface which illustrates the affects of applying a weighing scheme to one or more of said statistical information attributes, said weighing scheme being applied add emphasis to a particular statistical information attribute.

10. The method according to claim 9 further comprising the steps of:
    activating at least one point on the interface display representative of particular code segments;
    retrieving the representative code segments; and
    generating a secondary interface for displaying the representative code segments.

11. The method according to claim 9 further comprising the steps of:
    activating at least one point on the interface display representative of a particular code segment;
    retrieving statistical information relating to the particular code segment; and
    generating a secondary interface for displaying the statistical information.

12. The interface according to claim 9 wherein said external metric is a distance function.

13. The interface according to claim 12 where said distance function, $d_{i,j}$ is equal to $$d_{i,j} = \sum_k w_k (X_{ik} - X_{jk})^2$$

where $d_{i,j}$=distance between segment i and segment j
k=number assigned to attribute where k=1, ... K
$W_k$=weight applied to $k^{th}$ attribute
$X_{ik}$=value of $k^{th}$ attribute in segment i
$X_{jk}$=value of $k^{th}$ attribute in segment k.

14. The interface according to claim 9 wherein said metric incorporates multidimensional scaling techniques.

15. The method according to claim 9 wherein said first cluster interface is a tree representation.

16. The method according to claim 15 wherein said second cluster interface is a tree representation.

17. The method according to claim 9 further comprising:
    actively highlighting a particular statistical information attribute contained in said interface display; and
    generating a second interface display which displays information relating to the highlighted statistical information attribute.

18. The method according to claim 9 wherein said interface display further comprises a second cluster interface which illustrates the similarity of the code segment being compared based on the applied weighing scheme.

* * * * *